United States Patent [19]

Okumura et al.

[11] 3,846,573
[45] Nov. 5, 1974

[54] METHOD OF STABILIZING ORGANIC COMPOUNDS AGAINST OXIDATION WITH ISOQUINOLINE DERIVATIVES

[75] Inventors: Shinji Okumura, Tokyo; Shito Takeshita, Kawasaki; Hitoshi Enei, Zushi; Sadayoshi Ninagawa, Yokohama, all of Japan

[73] Assignee: Ajinomoto Co., Inc., Tokyo, Japan

[22] Filed: Aug. 17, 1973

[21] Appl. No.: 389,206

[30] Foreign Application Priority Data
Aug. 22, 1972 Japan.................... 47-83861

[52] U.S. Cl................ 426/182, 426/228, 426/328, 260/287 R, 252/403, 424/258
[51] Int. Cl................................. A23d 5/04
[58] Field of Search ........... 426/181, 182, 228, 328; 260/283 R, 287 R; 252/403, 404; 424/258, 319

[56] References Cited
UNITED STATES PATENTS
3,149,117  9/1964  Brown................ 252/403
3,772,304  11/1973  Grethe et al............ 260/287 R OTHER PUBLICATIONS
Chemical Abstracts, Vol. 75, 1971, 1375546, Bell et al.
Chemical Abstracts, Vol. 77, 1972, 48773w, Daxenbichler et al.
Chemical Abstracts, Vol. 76, 1972, 99482n, Brossi et al.

*Primary Examiner*—Norman Yudkoff
*Assistant Examiner*—Curtis P. Ribando
*Attorney, Agent, or Firm*—Hans Berman

[57] ABSTRACT

Small amounts of isoquinoline derivatives of the formula

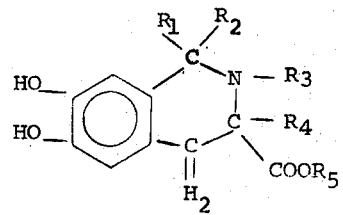

retard oxidation of fats, oil, plastics, rubbers, and other organic compounds by atmospheric oxygen, when $R_1$ is hydrogen or lower alkyl; $R_2$ is hydrogen, lower alkyl, carboxy or carbo-alkoxy having up to 24 carbon atoms in the alkoxy moiety; $R_3$ is hydrogen, or $R_2$ and $R_3$ jointly constitute a second carbon-to-nitrogen bond; $R_4$ is hydrogen or lower alkyl; and $R_5$ is hydrogen, alkali metal, or alkyl having up to 24 carbon atoms.

8 Claims, No Drawings

METHOD OF STABILIZING ORGANIC COMPOUNDS AGAINST OXIDATION WITH ISOQUINOLINE DERIVATIVES

This invention relates to the protection of organic compounds against oxidation by atmospheric oxygen, and particularly to a method of stabilizing such organic compounds against oxidation.

Oils, of animal, vegetal, or mineral origin, fats, rubbers, paraffin wax, synthetic resins, and like organic materials are sensitive to atmospheric oxygen, and deteriorate in storage due to contact with air. It is known to admix small amounts of butylated hydroxyanisole (BHA), butylated hydroxytoluene (BHT), ascorbic acid and its salts to oxygen-sensitive organic materials, but there is a need for other antioxidants which are more effective and/or less toxic to humans.

It has now been found that isoquinoline derivatives of the formula

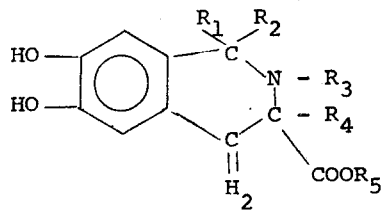

are effective antioxidants in amounts so small as to be without significant toxicity to humans. In this formula, $R_1$ is hydrogen or lower alkyl; $R_2$ is hydrogen, lower alkyl, carboxy or carbo-alkoxy having up to 24 carbon atoms in the alkoxy moiety; $R_3$ is hydrogen, or $R_2$ and $R_3$ jointly constitute a second carbon-to-nitrogen bond; $R_4$ is hydrogen or lower alkyl; and $R_5$ is hydrogen, alkali metal, or alkyl having up to 24 carbon atoms.

The compounds of the invention are water-soluble when $R_5$ is hydrogen or alkali metal, and are soluble in fats, oils, and like organic compounds when $R_5$ is alkyl and/or $R_2$ is carboalkoxy. They also form acid addition salts with hydrochloric, sulfuric, tartaric, succinic, oxalic, p-toluene-sulfonic, pyrrolidonecarboxylic, acetic acid, and a wide variety of other acids having a first dissociation constant at least similar to those of the acids specifically enumerated.

The compounds of the invention are readily prepared by Pictet-Spengler isoquinoline synthesis from 3,4-dihydroxyphenylalanine (DOPA) or salts thereof with suitable carbonyl compounds. The free acids so produced are readily converted to esters in a conventional manner, and the esters, particularly those of alcohols having at least four carbon atoms, effectively inhibit oxidation of fatty and oily triglycerides, such as vegetable oils, animal fats, fish oils, also liquid and solid hydrocarbons including paraffin wax, petroleum fractions including lubricants and motor fuel, the solid polymers of α-monoolefins including polyethylene and polypropylene, transformer oils and the like. Synthetic resins whose oxidation resistance can be improved by small amounts of the compounds of the invention include linear polyesters and alkyd resins. Natural and synthetic rubbers age more slowly when containing the isoquinoline derivatives of this invention, and similar beneficial effects have been observed in various oxygen-sensitive insecticide compositions and medicines, the water soluble compounds being employed in aqueous solutions or dispersions of oxygen-sensitive organic compounds.

The application of the isoquinoline derivatives most extensively tested so far is the protection of edible fats and oils, the fatty acids derived from these fats and oils, and the soaps which are alkali metal salts of the fatty acids. The fats and oils which can be stabilized with very small amounts of the isoquinoline derivatives include butter, margerine, soy bean oil, cotton seed oil, sesame oil, rape seed oil, olive oil, corn oil, peanut oil, fish oils generally, the fatty acids derived from such fats and oils including oleic acid, linoleic acid, linolenic acid, arachidonic acid, and the soaps which are alkali metal salts of the acids.

The amount of isoquinoline derivative that is intimately mixed with the organic material to be stabilized varies with the degree of stabilization required, with the presence or absence of other stabilizing materials, the nature and purity of the material to be protected against oxidation, and other factors. Generally, measurable protection can be had with as little as 0.001 percent of the isoquinoline derivatives, and no further benefits can be achieved by increasing the admixture to more than 1 percent, all percentage values herein being by weight unless specifically stated otherwise.

The following Examples further illustrate the preparation and use of isoquinoline derivatives according to the invention.

EXAMPLE 1

5 g L-DOPA and 6 g pyruvic acid were dissolved in 100 ml water. The pH of the solution was adjusted to pH 6.0 with ammonium hydroxide, and the solution was kept at 37°C for 40 hours. It was then acidified to pH 3.0 with hydrochloric acid, and evaporated to about 12 ml in a vacuum at a temperature not exceeding 40°C. Upon storage of the residue at 0° to 5°C for 24 hours, white crystals formed. When recovered and dried, they weighed 3.2 g and melted at 220°C with decomposition.

The product was identified as 1-methyl-1,3-dicarboxy-6,7-dihydroxy-1,2,3,4-tetrahydroisoquinoline of the formula

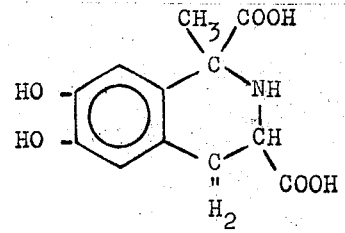

by nuclear magnetic resonance and mass spectrometer tests. A paper chromatogram gave an Rf value of 0.45 (n-butanol/glacial acetic acid/water 4/1/1 by volume).

EXAMPLE 2

A solution of 2 g 1-methyl-1,3-dicarboxy-6,7-dihydroxy-1,2,3,4-tetrahydroisoquinoline in 100 ml 1-N aqueous ammonium hydroxide was allowed to stand 24 hours, and was then neutralized with hydrochloric acid. Yellow crystals of 1-methyl-3-carboxy-6,7-dihydroxy-3,4-dihydroisoquinoline of the formula

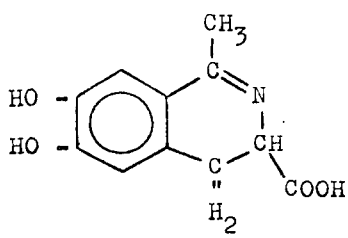

precipitated. When recovered, they weighed 0.72 g and melted at 236° with decomposition.

The compound was identified by nuclear molecular resonance and mass spectrometer tests and gave an Rf value of 0.18 under the conditions of Example 1.

EXAMPLE 3

A mixture of 3.94 g L-DOPA, 0.4 g sodium sulfite, 5.8 g acetone, and 35 ml 28 percent aqueous ammonia was heated in a 100 ml stainless steel autoclave with stirring at 115°C for 50 minutes. It was then cooled to room temperature and evaporated to 10 ml in a vacuum. A crystalline precipitate formed in the concentrate after overnight storage at 5°C, and was found to consist of 4.34 g 1,1-dimethyl-3-carboxy-6,7-dihydroxy-1,2,3,4-tetrahydroisoquinoline melting at 236° – 240°C with decomposition. It was identified as in the preceding Examples.

The 1-methyl-1-ethyl homolog was prepared in an analogous manner when the acetone was replaced by methylethylketone.

EXAMPLE 4

2 g L-DOPA and 2 g 20 percent aqueous formaldehyde solution were mixed with 100 ml 0.1 N hydrochloric acid, and the mixture was adjusted to pH 5.0 with ammonium hydroxide solution. After 24 hours standing at ambient temperature, a crystalline precipitate formed and was recovered. It consisted of 1.4 g 3-carboxy-6,7-dihydroxy-1,2,3,4-tetrahydroisoquinoline melting at 276° – 283°C (decomp.) which was identified by elementary analysis.

| Calculated for $C_{10}H_{11}O_4N.1/2\ H_2O$ | 55.04%C, | 5.54%H, | 6.42%N |
|---|---|---|---|
| Found: | 55.31 | 5.46 | 6.38 |

EXAMPLE 5

18.5 g 3,4-Dihydroxyphenylalanine methyl ester hydrochloride and 20 mg p-toluenesulfonic acid were dissolved in a mixture of 100 ml dimethylformamide and 100 ml 2,2-dimethoxypropane, and the mixture was heated 4 hours at 80°C under a nitrogen blanket. It was then partly evaporated in a vacuum to form white crystals of 1,1-dimethyl-3-carbomethoxy-6,7-dihydroxy-1,2,3,4-tetrahydroisoquinoline hydrochloride. When recrystallized from methanolether, the compound melted at 146°C with decomposition. It was identified by elementary analysis:

EXAMPLE 6

A solution of 5 g α-methyl-3,4-dihydroxyphenylalanine and 5 g sodium pyruvate in 500 ml water was adjusted to pH 1.0 with hydrochloric acid and stored 16 hours at 31.5°C. It was then adjusted to pH 3.0 with ammonia, and partly evaporated in a vacuum at less than 40°C to crystallize 1,3-dimethyl-1,3-dicarboxy-6,7-dihydroxy-1,2,3,4-tetrahydroisoquinoline.

The compound gave an Rf value of 0.18 in a paper chromatogram developed as in Example 1.

EXAMPLE 7

2.2 g 1-Methyl-3-carboxy-6,7-dihydroxy-3,4-dihydroisoquinoline prepared as in Example 2 and 38.8 g lauryl alcohol were reacted in the presence of hydrogen chloride for 10 hours at 40° – 50°C in a 100 ml three-neck flask equipped with a stirrer, reflux condenser, and thermometer. Unreacted 1-methyl-3-carboxy-6,7-dihydroxy-3,4-dihydroisoquinoline was filtered from the esterification mixture, and excessive lauryl alcohol was distilled from the filtrate in a vacuum. The residue was neutralized with aqueous sodium carbonate solution.

The crystalline lauryl ester of 1-methyl-3-carboxy-6,7-dihydroxy-3,4-dihydro-isoquinoline was obtained in a yield of 71.4 percent, and melted at 113° – 115°C. It was identified by elementary analysis:

| Calculated for $C_{23}H_{35}NO_4$: | 70.92%C, | 9.06%H; | 3.60%N |
|---|---|---|---|
| Found: | 70.96 | 9.17 | 3.51 |

The butyl, pentyl and stearyl esters of the same 3-carboxyisoquinoline derivative, and the corresponding mono-esters and di-esters of the other 1-and/or 3-carboxyisoquinoline compounds of the invention were prepared in an analogous, conventional manner, and had up to 24 carbon atoms in their alcohol moieties.

EXAMPLE 9

9.85 g L-DOPA and 2.6 g acetaldehyde were added to 200 ml water, and the pH of the mixture was adjusted to 0.9 with hydrochloric acid. After 16 hours standing at room temperature, the solution was adjusted to pH 6.6 with ammonia, and 1-methyl-3-carboxy-6,7-dihydroxy-1,2,3,4-tetrahydroisoquinoline was precipitated in crystalline form. The recovered crystals weighed 9.1 g.

EXAMPLE 10

Respective batches of soy bean oil were mixed thoroughly with 0.02 percent of the antioxidants identified by Roman numerals as follows:
I BHT
II 1-Methyl-3-carboxy-6,7-dihydroxy-3,4-dihydro-isoquinoline lauryl ester
III 1-Methyl-3-carboxy-6,7-dihydroxy-3,4-dihydroisoquinoline pentyl ester
IV 1-Methyl-3-carboxy-6,7-dihydroxy-1,2,3,4-tetrahydroisoquinoline lauryl ester

| Calculated for $C_{13}H_{17}NO_4 HCl$: | 54.3% C; | 6.3% H; | 4.8% N; | 12.32% Cl |
|---|---|---|---|---|
| Found: | 54.06 | 6.54 | 4.77 | 12.32 |

V 1-Methyl-3-carboxy-6,7-dihydroxy-1,2,3,4-tetrahydroisoquinoline pentyl ester

VI 1-Methyl-1,3-dicarboxy-6,7-dihydroxy-1,2,3,4-tetrahydroisoquinoline dilauryl ester VII 1-Methyl-1-ethyl-3-carboxy-6,7-dihydroxy-1,2,3,4-tetrahydroisoquinoline butyl ester.

Each mixture was held at 97.8°C while a uniform, constant stream of air was bubbled through the hot oil. The peroxide value of each batch was determined after 5, 10 and 20 hours in milliequivalent of peroxide formed per kilogram of oil. For comparison purposes, a control batch of oil free from antioxidant was subjected to the same treatment. The results are listed in Table 1 below:

TABLE 1

| Anti-Oxidant | Peroxide Value | | |
|---|---|---|---|
| | 5 hrs. | 10 hrs. | 20 hrs. |
| None | 3.8 | 38.2 | 766.0 |
| I | 3.9 | 17.7 | 423.4 |
| II | 3.1 | 5.2 | 27.7 |
| III | 3.1 | 4.8 | 23.3 |
| IV | 3.5 | 4.0 | 6.0 |
| V | 3.0 | 4.2 | 6.3 |
| VI | 3.0 | 19.2 | 164.8 |
| VII | 3.7 | 20.8 | 256.1 |

EXAMPLE 11

The procedure of Example 10 was repeated with lard instead of soy bean oil, and the results are tabulated in an analogous manner in Table II.

TABLE II

| Anti-Oxidant | Peroxide Value | | |
|---|---|---|---|
| | 5 hrs. | 10 hrs. | 20 hrs. |
| None | 4.0 | 12.0 | 173.0 |
| I | 3.8 | 10.5 | 43.6 |
| II | 2.1 | 2.3 | 2.6 |
| III | 2.0 | 2.4 | 2.7 |
| IV | 2.3 | 2.4 | 3.0 |
| V | 2.1 | 2.5 | 2.8 |
| VI | 2.8 | 3.6 | 11.5 |
| VII | 2.8 | 4.5 | 26.3 |

EXAMPLE 12

Respective batches of soy bean oil were mixed with amounts of 1-methyl-3-carboxy-6,7-dihydroxy-3,4-dihydroisoquinoline lauryl ester (II) varying from 0.0002 to 0.02 percent, and with 0.02 percent BHT (I). The mixtures and a batch of unmixed oil were subjected to the oxidation test described in Example 10 with the results shown in Table III.

TABLE III

| Anti-Oxidant | Peroxide Value | | |
|---|---|---|---|
| | 5 hrs. | 10 hrs. | 20 hrs. |
| None | 2.8 | 30.0 | 605.5 |
| 0.02% I | 3.9 | 17.7 | 423.4 |
| 0.0002% II | 3.0 | 25.4 | 634.3 |
| 0.0004% II | 1.5 | 24.8 | 514.3 |
| 0.001% II | 3.3 | 20.8 | 691.4 |
| 0.002% II | 2.3 | 15.0 | 599.3 |
| 0.006% II | 1.7 | 6.2 | 293.1 |
| 0.02% II | 2.6 | 4.9 | 11.6 |

What is claimed is:

1. A method of protecting an organic material against oxidation which comprises mixing said material with an isoquinoline derivative of the formula

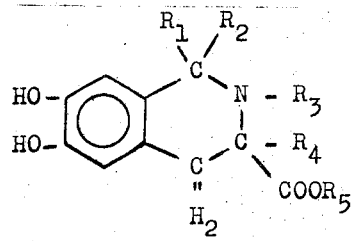

wherein $R_1$ is hydrogen or lower alkyl; $R_2$ is hydrogen, lower alkyl, carboxy or carbo-alkoxy, said alkoxy having up to 24 carbon atoms; $R_3$ is hydrogen, or $R_2$ and $R_3$ jointly constitute a second carbon-to-nitrogen bond; $R_4$ is hydrogen or lower alkyl; and $R_5$ is hydrogen, alkali metal or alkyl having up to 24 carbon atoms;

said organic material being an oil, fat or wax of animal, vegetal, or mineral origin, rubber, or sythetic resin, and sensitive to oxidation by atmospheric oxygen, and the amount of said derivative being sufficient to retard said oxidation.

2. A method as set forth in claim 1, wherein said material is an edible oil or fat, and the amount of said derivative is between 0.001 and 1.0 percent of the weight of said material.

3. A method as set forth in claim 2, wherein $R_5$ is alkyl.

4. A method as set forth in claim 3, wherein each of said lower alkyl has up to four carbon atoms.

5. A method as set forth in claim 2, wherein $R_1$ is methyl, $R_2$ and $R_3$ are each hydrogen or jointly constitute said carbon-to-nitrogen bond, $R_4$ is hydrogen, and $R_5$ is alkyl.

6. A method as set forth in claim 2, wherein $R_1$ and $R_2$ are lower alkyl, $R_3$ is alkoxy, $R_4$ is hydrogen, and $R_5$ is alkyl.

7. A method as set forth in claim 2, wherein $R_1$ is lower alkyl, $R_2$ is carboalkoxy, $R_3$ and $R_4$ are hydrogen, and $R_5$ is alkyl.

8. An organic material protected against oxidation by the method set forth in claim 4.

* * * * *